US008381242B2

(12) United States Patent
Berg et al.

(10) Patent No.: US 8,381,242 B2
(45) Date of Patent: Feb. 19, 2013

(54) STATIC ANALYSIS FOR VERIFICATION OF SOFTWARE PROGRAM ACCESS TO SECURE RESOURCES FOR COMPUTER SYSTEMS

(75) Inventors: Ryan Berg, Sudbury, MA (US); Paolina Centonze, Amawalk, NY (US); Marco Pistoia, Amawalk, NY (US); Omer Tripp, Har-Adar, IL (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/839,533

(22) Filed: Jul. 20, 2010

(65) Prior Publication Data

US 2012/0023553 A1 Jan. 26, 2012

(51) Int. Cl.
*G06F 21/00* (2006.01)
(52) U.S. Cl. ........................................ 725/25
(58) Field of Classification Search ............ 726/22, 726/25, 1; 717/126, 131, 132, 133
See application file for complete search history.

(56) References Cited

U.S. PATENT DOCUMENTS

| 2004/0243881 | A1* | 12/2004 | Wang et al. .............. 714/37 |
| 2008/0250493 | A1* | 10/2008 | Bassani et al. ............ 726/17 |

OTHER PUBLICATIONS

Reps, T., Horwitz, S., and Sagiv, M., Precise Interprocedural Dataflow Analysis via Graph Reachability. In Conference Record of the Twenty-Second ACM Symposium on Principles of Programming Languages, (San Francisco,CA, Jan. 23-25, 1995), pp. 49-61.

"The Protection of Information in Computer Systems", Jerome E. Saltzer et al, http://www.cs.virginia.edu/~evans/cs551/saltzer, downloaded Mar. 7, 2004 (50 pages) (1974).
"Runtime Verification of Authorization Hook Placement for the Linux Security Modules Framework", Proceedings of the 9th ACM Conference on Computer and Communications Securty, Antony Edwards, et al, IBM T.J. Watson Research Center, (May 17, 2002) (pp. 225-234).
"Checking for Race Conditions in File Accesses", Matt Bishop, Department of Computer Science, University of California at Davis, Computing Systems 9(2) (pp. 131-152) (1996).
"Static Analysis for J2EE Role-Based Access Control Policy Validation" Paolina Centonze, Polytechnic University (May 2005) (58 pages).
IBM Research Report, "Applying Static Analysis to Verifying Security Propertied", Xiaolan Zhang, et al, IBM Research Division, RC23246 (Wo406-083) Jun. 15, 2004 (8 pages).
Edwards, Antony, et al., "Runtime Verification of Authorization Hook Placement for the Linux Security Modules Framework", ACM 2002, pp. 225-234.

* cited by examiner

*Primary Examiner* — Edward Zee
(74) *Attorney, Agent, or Firm* — Harrington & Smith; Louis J. Percello

(57) ABSTRACT

A method includes, using a static analysis, analyzing a software program to determine whether the software program accesses a secure resource for a computer system without verification that the secure resource can be accessed by the software program. The method also includes, in response to an access by the software program to the secure resource without verification that the secure resource can be accessed by the software program, outputting a result indicative of the analyzing. Computer program products and apparatus are also disclosed. An apparatus is disclosed that includes a user interface providing a security report to a user, the security report indicating a result of an analysis of whether or not a software program accesses a secure resource for a computer system without verification that the secure resource can be accessed by the software program.

16 Claims, 12 Drawing Sheets

| p1 | p2 | ? |
|---|---|---|
| r1 | r1 | OK |
| r1 | r2 | NO |
| r1 | r1, r2 | NO |
| r1, r2 | r1 | NO |
| r1, r2 | r1, r2 | Static analysis |

STATIC ANALYSIS FOR VERIFICATION OF SOFTWARE PROGRAM ACCESS TO SECURE RESOURCES FOR COMPUTER SYSTEMS

BACKGROUND

This invention relates generally to analysis of software programs such as object code, bytecode, executable code, and libraries, and, more specifically, relates to static analysis of software programs.

Computer systems have secure resources (also called "protected" resources) where security to the protected resource is important. For example, it is beneficial to control access to a network socket (e.g., an endpoint for a communication flow across a computer network), as viruses and other malicious software programs can use a socket to send and receive data, potentially without a user's knowledge. Similarly, certain operating system and other files should be similarly controlled. Therefore, it would be beneficial to determine whether a software program is allowed to access a protected resource prior to the access.

Along these lines, the Principle of Complete Mediation dictates that access to any secure resource (also called a "protected" resource) for a computer system should be preceded by an appropriate verification check. Before a protected resource (e.g., a file or socket as in traditional access control, or even a method as in Role-Based Access Control) is accessed, a system enforces security by verifying that the entities responsible for that access are sufficiently verified. Such verification can include, e.g., authentication (e.g., the entity is the entity it says it is) or authorization (e.g., the entity is allowed to access the secure resource), or both. Such entities can include the user running the system as well as system-component providers.

Modern computer systems install a special access-control enforcer for verification, commonly called the "security manager". A problem that arises with access-control enforcement is that such enforcement is expensive. Therefore, verification systems tend to cache authorization checks.

This can lead to another problem because by the time a resource is accessed, the relevant verification check in the cache may no longer be valid, and a Time Of Check To Time Of Use (TOCTTOU) attack is possible. That is, at the time the verification, code for a software program verifies access to a first secure resource using a reference (e.g., a pointer) to the first secure resource. At the time an access is made to a secure resource using the pointer, the value of the pointer has changed and now points to a different secure resource for which authorization was not verified. It is also possible for the authorization mechanism to have not been correctly implemented and so, even when the authorization mechanism is supposed to enforce authorization for a particular resource, in reality the authorization mechanism is not doing so properly, or maybe the authorization mechanism is doing that for a resource that is not the intended one. As a consequence, a verification for the secure resource that is about to be accessed has not been performed, and such secure resource is therefore accessed without a verification check.

There are a few techniques for improving verification of access by software programs to secure resources for computer systems. The most labor intensive and least likely to produce adequate results is manual code inspection: a person checks every line of a software program for verification of access to secure resources.

Another technique is dynamic testing of the software program. This analysis involves executing the program and observing whether secure resources are accessed without verification. One problem with this technique is the technique is not conservative: a reported problem is a real problem (no false positives), but the result is potentially unsound, meaning that some real problems may not be discovered by the analysis (false negatives). For example, an access to a secure resource could be dependent on a value of a variable. Many of the values of the variable do not cause inappropriate access to a secure resource, whereas a single value of the variable may cause inappropriate access to a secure resource. A particular runtime environment may not adequately test all possible values of the variable, and therefore miss the inappropriate access to a secure resource.

In contrast to dynamic analysis of a software program, a static analysis of a software program evaluates the program statically and the program is not executed during this process. Certain models (such as call graphs and points-to graphs) may be created from the software program, based on a line-by-line interpretation of the program. Such models may be analyzed to determine information about the software program.

The inventors have realized that there are certain benefits in applying static analysis of a software program to an analysis for verification of software program access to secure resources for computer systems, especially when it comes to security analysis, in which case it is essential not to miss any security issue. Such benefits overcome the previously described problems, especially with the dynamic analysis of software programs.

SUMMARY

In an aspect of the invention, a method includes, using a static analysis, analyzing a software program to determine whether the software program accesses a secure resource for a computer system without verification that the secure resource can be accessed by the software program. The method also includes, in response to an access by the software program to the secure resource without verification that the secure resource can be accessed by the software program, outputting a result indicative of the analyzing. In other exemplary embodiments, computer program products and apparatus are also disclosed.

In another aspect of the invention, an apparatus is disclosed that includes a user interface providing a security report to a user, the security report indicating a result of an analysis of whether or not a software program accesses a secure resource for a computer system without verification that the secure resource can be accessed by the software program.

BRIEF DESCRIPTION OF THE SEVERAL VIEWS OF THE DRAWINGS

FIG. 6, including

DETAILED DESCRIPTION

As described above, the inventors have realized that there are benefits in applying static analysis of a software program to an analysis for verification of software program access to secure resources for computer systems. Such benefits include that a result of a static analysis is potentially conservative, meaning that not all the reported problems are real problems (false positives), but at least all the problems of the program under analysis are detected (no false negatives). In other words, the analysis results are theoretically sound, which means that all real problems will be found. These exemplary benefits are significant benefits relative to the manual code inspection and dynamic analysis previously described, especially when the purpose of the analysis is to detect security problems—in which case it is desirable not to miss any of them.

Before proceeding with additional description of the exemplary embodiments of the invention, it is helpful to provide description of problems associated with verification of access to secure resources. In terms of the Principle of Complete Mediation, it has been said that "[e]very access to every object must be checked for authority". However, different systems may have: (1) Different resources that need to be protected; and (2) Different ways to protect those resources. Therefore, the problem is system-specific.

Figure 1:
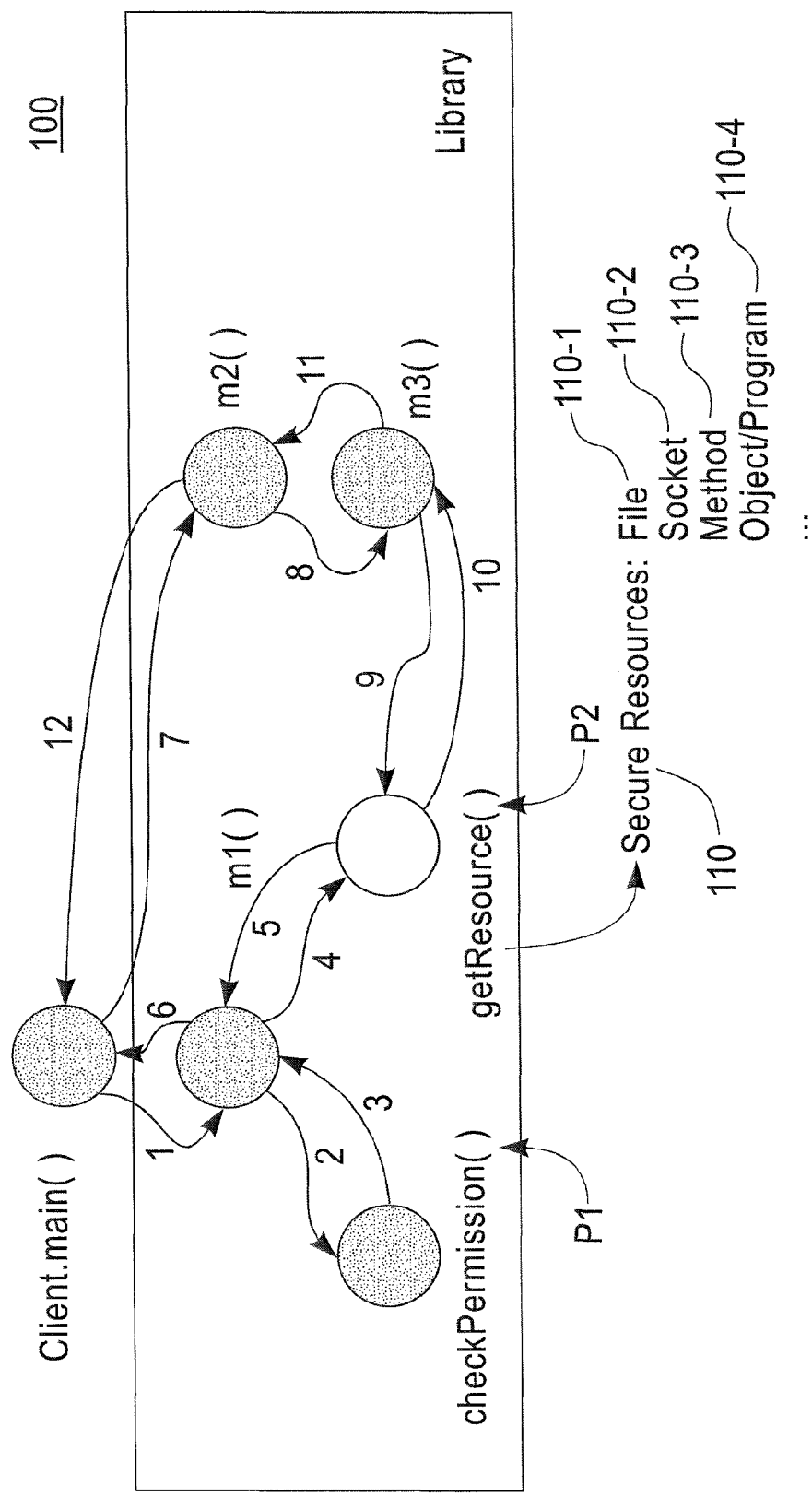
FIG. 1 is a call graph of a program, where the call graph is used to illustrate problems with security of secure resources in a computer system.

Turning now to FIG. 1, a call graph 100 is shown of a software program that is used to illustrate these points. In FIG. 1, Client.main( ) would like to access a secure resource 110 (in this example, a file 110-1, a socket 110-2, a method 110-3, an object or another program 110-4, etc.). Secure resource 110 is a resource that is accessible by a computer and may be remote from the computer (e.g., accessed via a network) or contained within the physical confines of the computer. A "secure" resource 110 is deemed secure by, e.g., the system at hand or by a customer providing a list of secure resources (described in more detail below) or by some combination of these. Secure resources can also be inferred statically by detecting which resources are guarded by some security checks. Some resources may be guarded by security checks in some cases but not in other cases, and one of the purposes of this invention is to detect the cases in which security checks have not been inserted.

A pathway through the software program that provides for verification includes edges 1, 2, 3, 4, 5, and 6. In this path, Client.main( ) calls (edge 1) method m1( ), which then calls (edge 2) checkPermission( ), which verifies that Client.main( ) is allowed to access the resource 110. The checkPermission( ) reports (edge 3) the verification back to method m1( ), which then accesses the secure resource 110 via (edge 4) getResource( ). The method getResource( ) returns (edge 5) to m1( ), which returns (edge 6) to Client.main( ), e.g., with data from the secure resource 110. It is noted that the method getResource( ) may also be considered to be a secure resource, as once this method is accessed, the secure resource 110 may be accessed.

A pathway through the software program that does not provide for verification includes edge 7 through edge 12. In this path, the Client.main( ) calls method m2( ), which calls m3( ), which accesses the secure resource 110 via getResource( ). There is no verification performed prior to access of the secure resource 110 in the path including edges 7 through 12.

This example illustrates why more is needed than simply a call graph 100 to determine whether verification occurs prior to access of the secure resource 110. For instance, a call graph does not typically provide the order of occurrence of edges. Instead, the numbering of edges in FIG. 1 is for illustration. Another problem with call graph 100 is that there could be potential pathways where verification might be performed. For instance, the path that includes edges 7, 8, 9, 5, 2, 3, 4, 10, 11, and 12 is at least theoretically a pathway where verification might be performed. Thus, additional techniques (described below) are used to ensure verification.

Another problem, briefly described in reference to FIG. 1 and described below in more detail in reference to FIGS. 8A and 8B, relates to Time Of Check To Time Of Use (TOCTTOU) attacks. In brief, when checkPermission( ) performs its verification of Client.main( ), checkPermission( ) uses reference (e.g., a pointer) p1 to the secure resource 110. Between the time when Client.main( ) is verified to access the secure resource 110 pointed to by p1 and the time getResource( ) accesses the secure resource 110 by using p2 (e.g., a later version of p1), if p1 is not equal to p2, p2 now potentially references a different secure resource 110. This means a verification for access to the secure resource 110 referenced by p2 may not have been performed.

Exemplary embodiments of the invention include an algorithm that can be used to identify potential violations of the Principle of Complete Mediation in different systems. The exemplary embodiments are flexible and configurable and verify complete mediation for different resources and with different authorization checks. The exemplary embodiments support both open-world and closed-world. "Open-world" means that a software program is incomplete. For instance, the library shown in FIG. 1 is incomplete, but can be analyzed as an incomplete program. "Closed-world" is a complete program, such as the combination of the library and client shown in FIG. 1.

The exemplary embodiments are precise: they are theoretically sound and conservative. The exemplary embodiments may verify that every access to a secure resource is mediated by a verification check. In an exemplary embodiment, a verification and analysis tool is built on a WALA (T. J. Watson Libraries for Analysis) static analysis tool (also referred to as an engine). An exemplary embodiment analyzes JAVA (a programming language and computing platform first released by Sun Microsystems in 1995) programs, but the techniques can be applied to non-JAVA programs as well.

Figure 2:
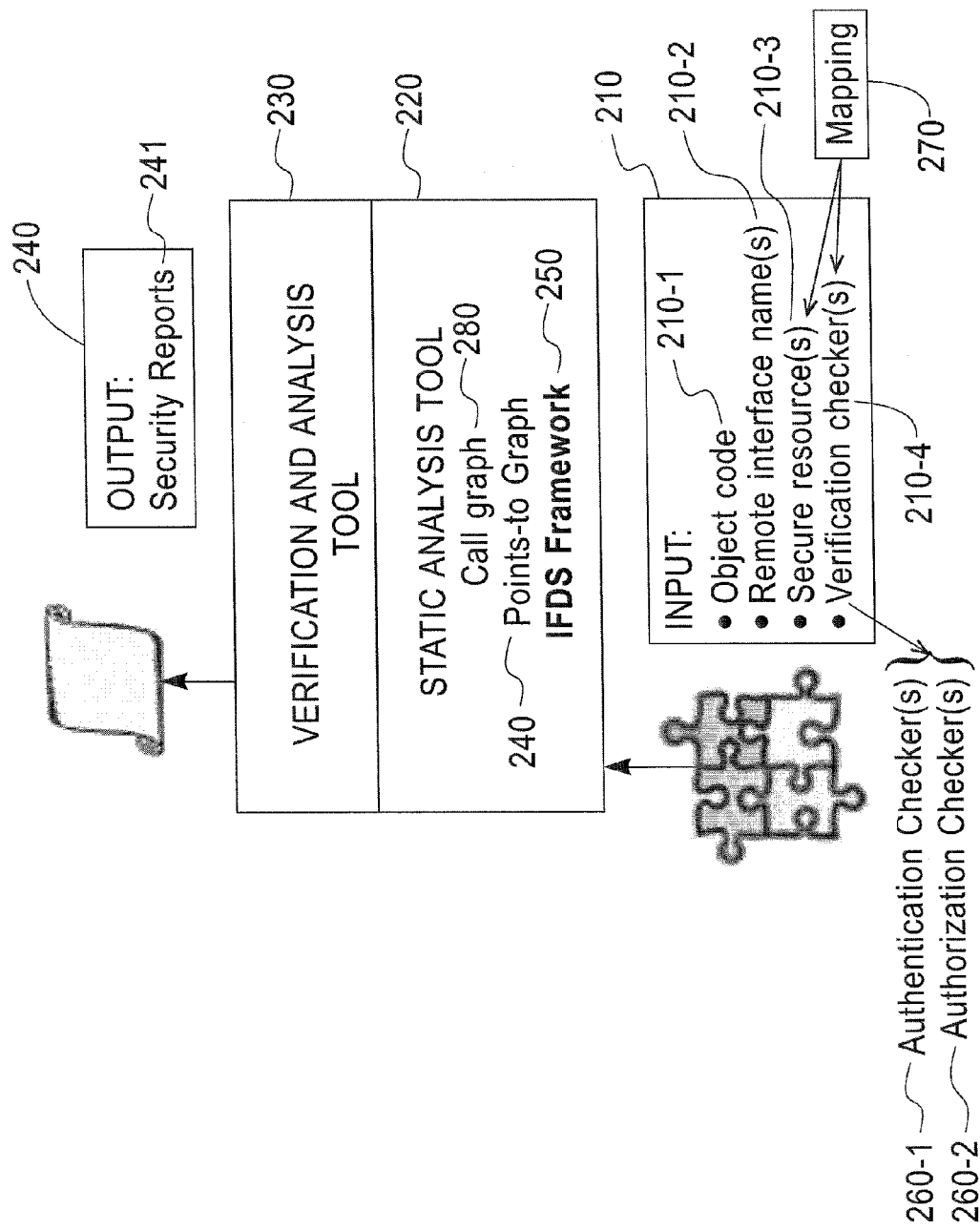
FIG. 2 is an exemplary illustration of a logical framework for verification of software program access to secure resources for computer systems.

Turning to FIG. 2, an exemplary illustration of a logical framework is shown for verification of software program access to secure resources for computer systems. A static analysis tool 220 accepts input 210 of (in this example) object code 210-1, which is the complete or incomplete software program to be examined, one or more remote interface names 210-2, which are programmatic specifications of the methods exposed by a class to its clients, one or more secure resource(s) 210-3 (e.g., indications of secure resources 110) for which access is to be controlled, and one or more verification checker(s) 210-4 that control access to the secure resources 210-3. There may also be a mapping 270 that indicates which verification checker 210-4 should be used for verifying access to a secure resource 210-3. For instance, in the examples of FIGS. 5 and 6, the mapping 270 could indicate that the SecurityEnforcer.preInvoke( ) verification checker 210-4 is the verification checker 210-4 for the secure resources 210-3 of bean1.m1( ) and bean2.m2( ). The mapping 270 may be used for analysis and reporting (e.g., "SecurityEnforcer.preInvoke( ) is not called before an access to bean2.m2( ) by otherMethod( )").

In an exemplary embodiment, the static analysis tool 220 generates a call graph 280, a points-to graph 240, and an Interprocedural, Finite, Distributive, Subset (IFDS) framework 250 using the object code 210-1. In an exemplary embodiment, the static analysis tool 220 is a WALA (T. J. Watson Libraries for Analysis) static analysis tool. The verification and analysis tool 230 casts the complete mediation problem into an IFDS problem. In other words, the complete mediation is modeled as an interprocedural control-flow graph reachability problem.

The verification and analysis tool 230, in various embodiments, uses the call graph 280, the points-to graph 240, and IFDS framework 250, along with the remote interface names 210-2, the secure resources 210-3, and the verification checkers 210-4 (and any mapping 270) to generate an output 240 that in an example includes one or more security reports 241. The security reports 241 include a result of the analysis by the verification and analysis tool 230 and are described in more detail below.

The verification checkers 210-1 can include authentication checkers 260-1 and authorization checkers 260-2. An authentication checker 260-1 can determine whether the entity is the entity it says it is, such as by comparing a provided user identification and password with a list of user identifications and passwords. Authorization checkers 260-2 can determine, e.g., whether an entity is allowed to access the secure resource 210-3, such as by comparing a name of a subject requesting access to a secure resource 210-3 with a list of names allowed to access the secure resource 210-3.

Figure 3:
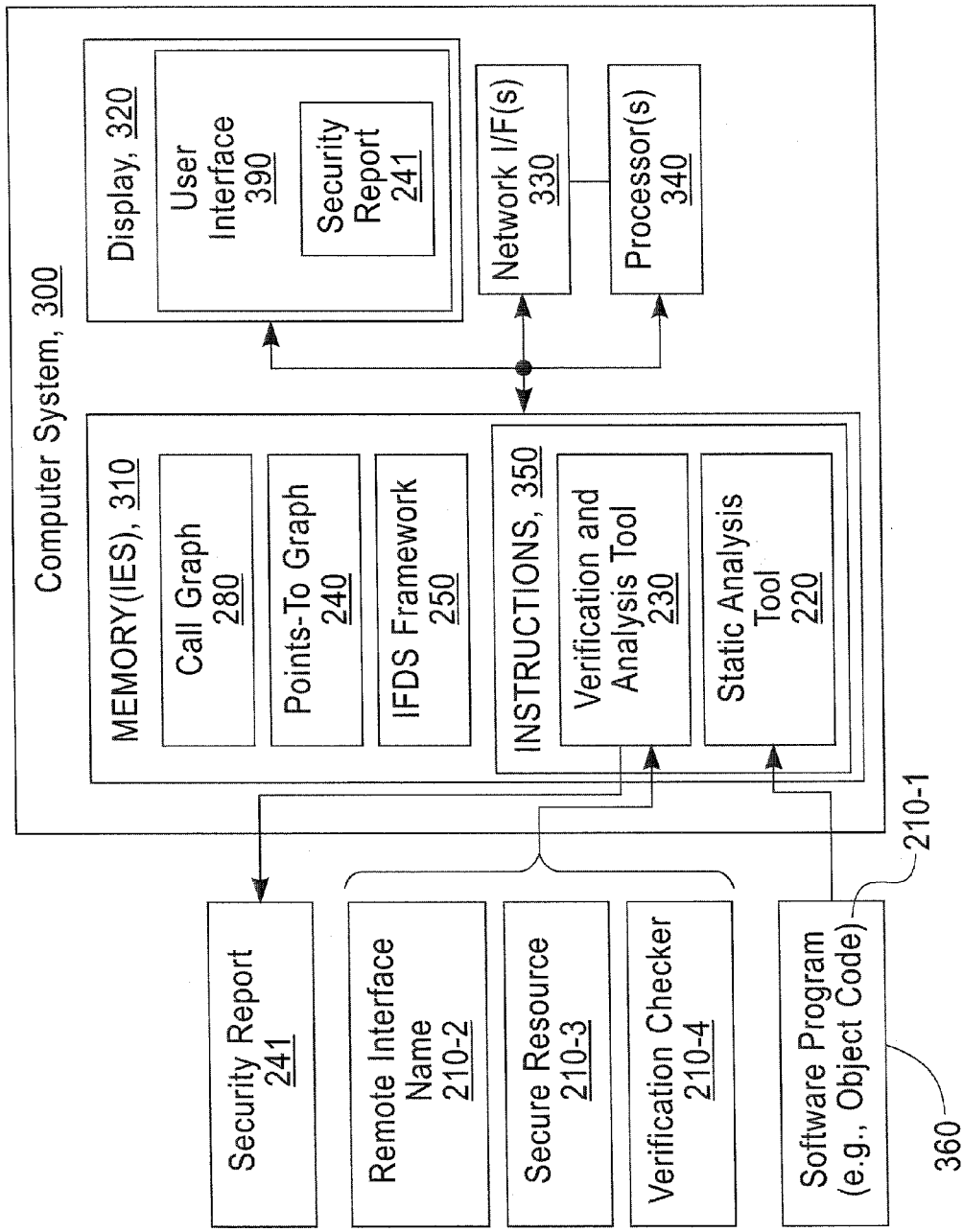
FIG. 3 is an exemplary computer system for verification of software program access to secure resources for computer systems.

Turning now to FIG. 3 (with reference to previous figures), an exemplary computer system 300 is shown that implements verification of software program access to secure resources for computer systems. The computer system 300 may be a client system, a server, a mobile device (e.g., cellular phone, wireless network device, and the like), or any other type of system able to analyze software programs. The computer system 300 in this example includes one or more memories 310, one or more displays 320 (which may also be separate from computer system 300), one or more network interfaces 330, and one or more processors 340. The one or more memories 310 include instructions 350, which when executed by the one or more processors 340, cause the computer system 300 to complete any or all of the actions described herein. In an exemplary embodiment, the display 320 is used to view the security report 241 via a user interface 390. In another exemplary embodiment, the security report 241 is sent (e.g., via network interface 330) to a customer, and the inputs 210 are also received (e.g., via network interface 330) from a customer. The network interface 330 could include wired and/or wireless interfaces.

It is noted that the secure resources 210-3 may be completely defined via input 210. In other words, e.g., a customer can define via a list of secure resources 210-3 the secure resources to be verified. In other examples, certain objects, files, sockets, and methods are predetermined to be secure resources and the customer may define only a portion of the secure resource 210-3. For example, network sockets might be known secure resources 210-3. Another example would be that certain or all JAVA beans are considered to be secure resources 210-3.

The software program 360 to be analyzed may be, e.g., object code 210-1, source code, byte code, library modules (such as those shown in FIGS. 1 and 8A), application code, and the like. The software program 360 could be a complete program or an incomplete program.

Figure 4:
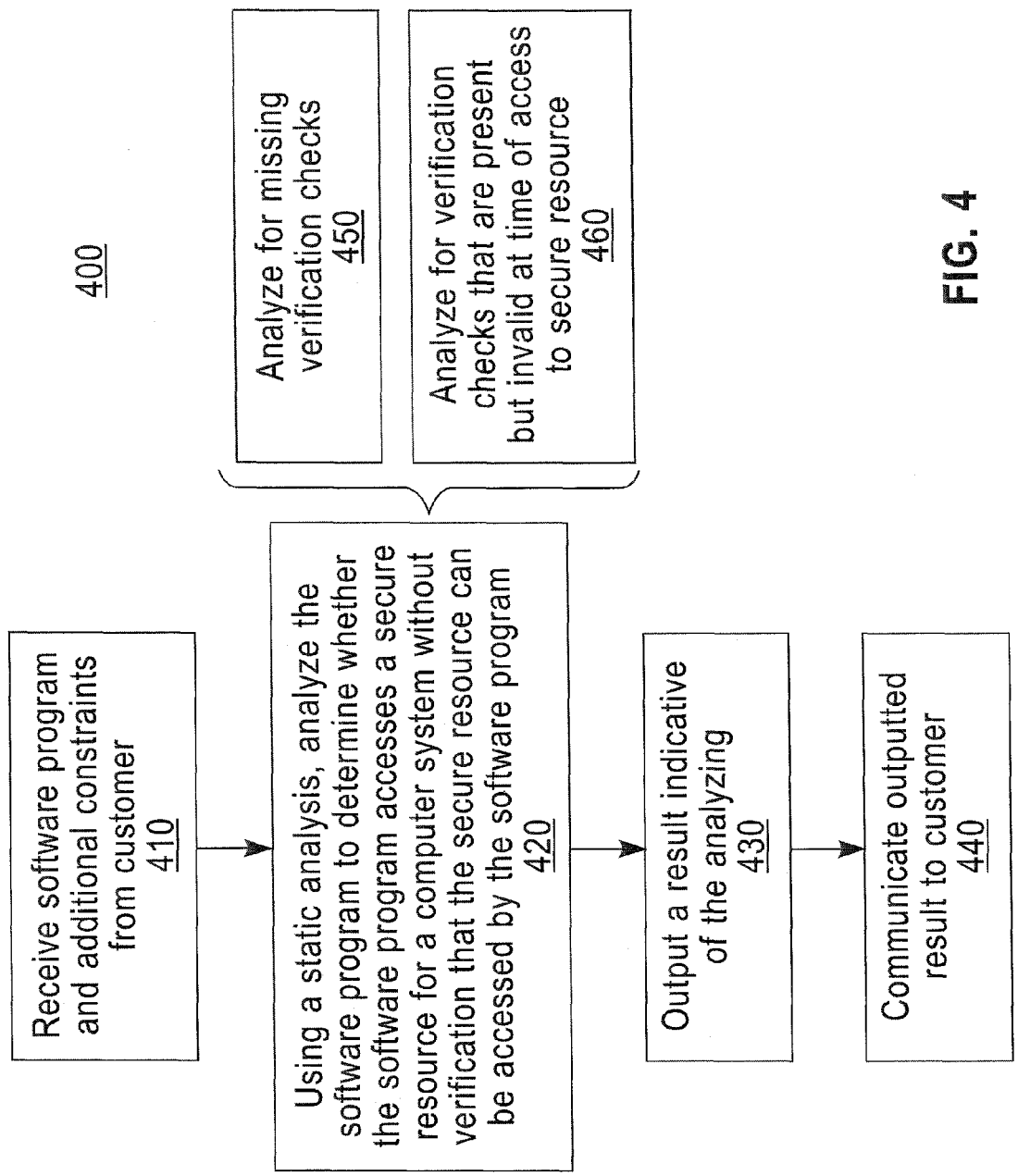
FIG. 4 is an exemplary flowchart for verification using static analysis of software program access to secure resources for computer systems, and performing such verification as a service to a customer.

Referring to FIG. 4 (with appropriate reference to previous figures), an exemplary flowchart 400 is shown for verification of software program access to secure resources for computer systems, and performing such verification as a service to a customer. In block 410, a software program 360 is received from a customer. Additional constraints, such as the input 210 (e.g., remote interface names 210-2, secure resources 210-3, and verification checkers 210-4) may also be received. In block 420, using a static analysis, a software program is analyzed (e.g., by verification and analysis tool 230) to determine whether the software program 360 accesses a secure resource 210-3 for a computer system 300 without verification that the secure resource 210-3 can be accessed by the software program 360. In block 430, a result (e.g., security report 241) is output, where the result is indicative of the analyzing performed in block 420. In block 440, the outputted result is communicated to the customer.

Block 420 may be performed in a number of ways, described in more detail below. Briefly, exemplary static analysis solutions herein detect whether (1) verification checks are missing (block 450; see also FIGS. 5-7 and associated text), or (2) verification checks are present but may be invalid due to the possibility of a resource (or a reference thereto) changing between verification-enforcement and access (block 460; see also FIGS. 8A, 8B, and 9 and associated text).

An exemplary embodiment for (1) is based on the IFDS algorithm: every protected resource is mapped to a dataflow fact instantiated at call sites in program entry points. Facts are propagated throughout the program and killed only on normal exits of authorization checks (e.g., they are not killed on exceptional exits). If the entry point of a resource access receives the relevant dataflow fact, the verification and analysis tool 230 reports a potential problem: there may exist a path that leads to the protected resource without a verification check.

As an exemplary embodiment for (2), the problem may be treated on a case-by-case basis. For example, using dataflow propagation, the verification and analysis tool 230 detects that the name of a protected file and the mode of access cannot be changed between the time verification (e.g., authorization) is enforced and access is made. Illustratively, for a socket, the verification and analysis tool 230 detects that the hostname, port number and mode of access do not change between the time the authorization is enforced and access is made.

Figure 5:
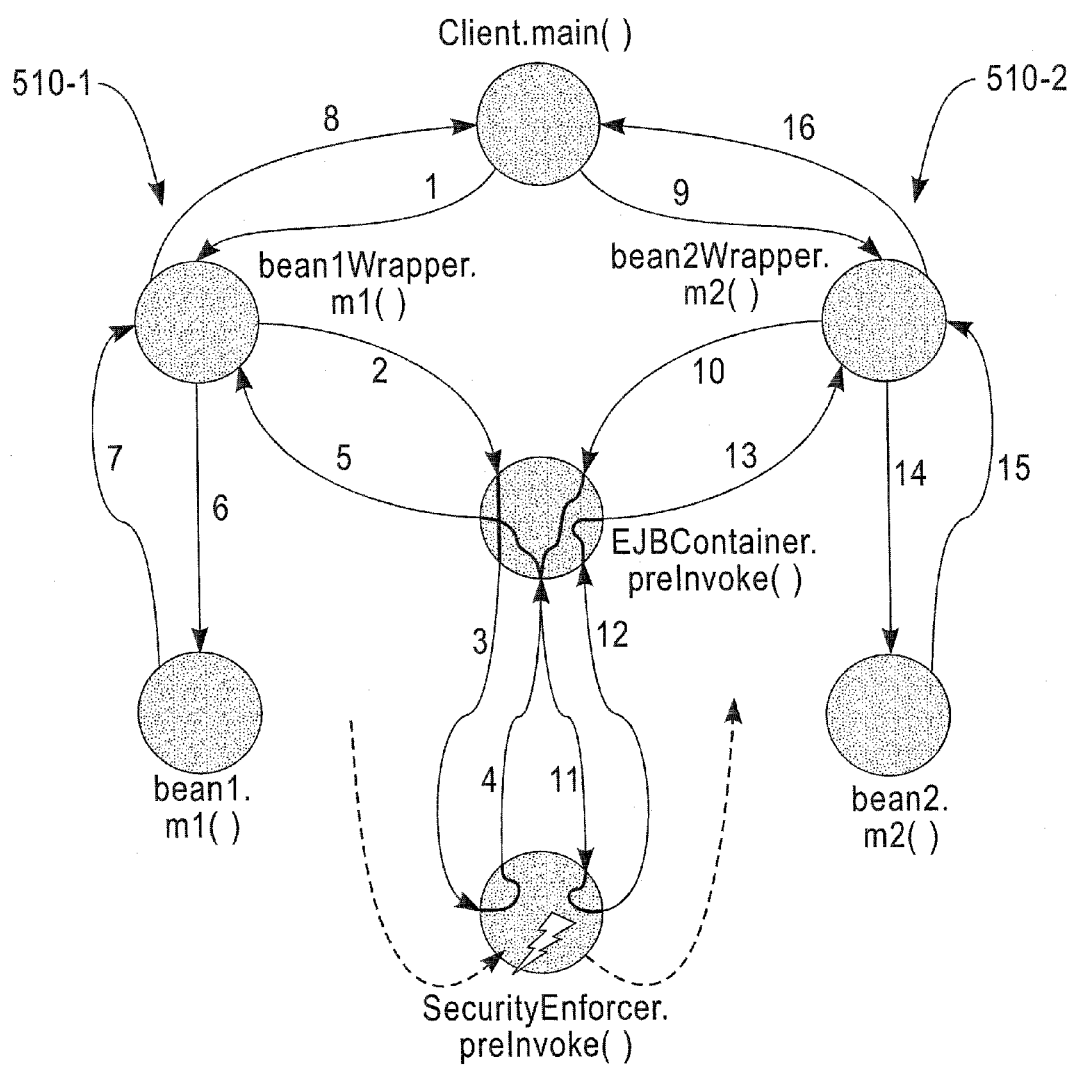
FIG. 5 is an example of a call graph for an exemplary software program, used to illustrate exemplary analysis for missing verification checks.
Figure 6A:
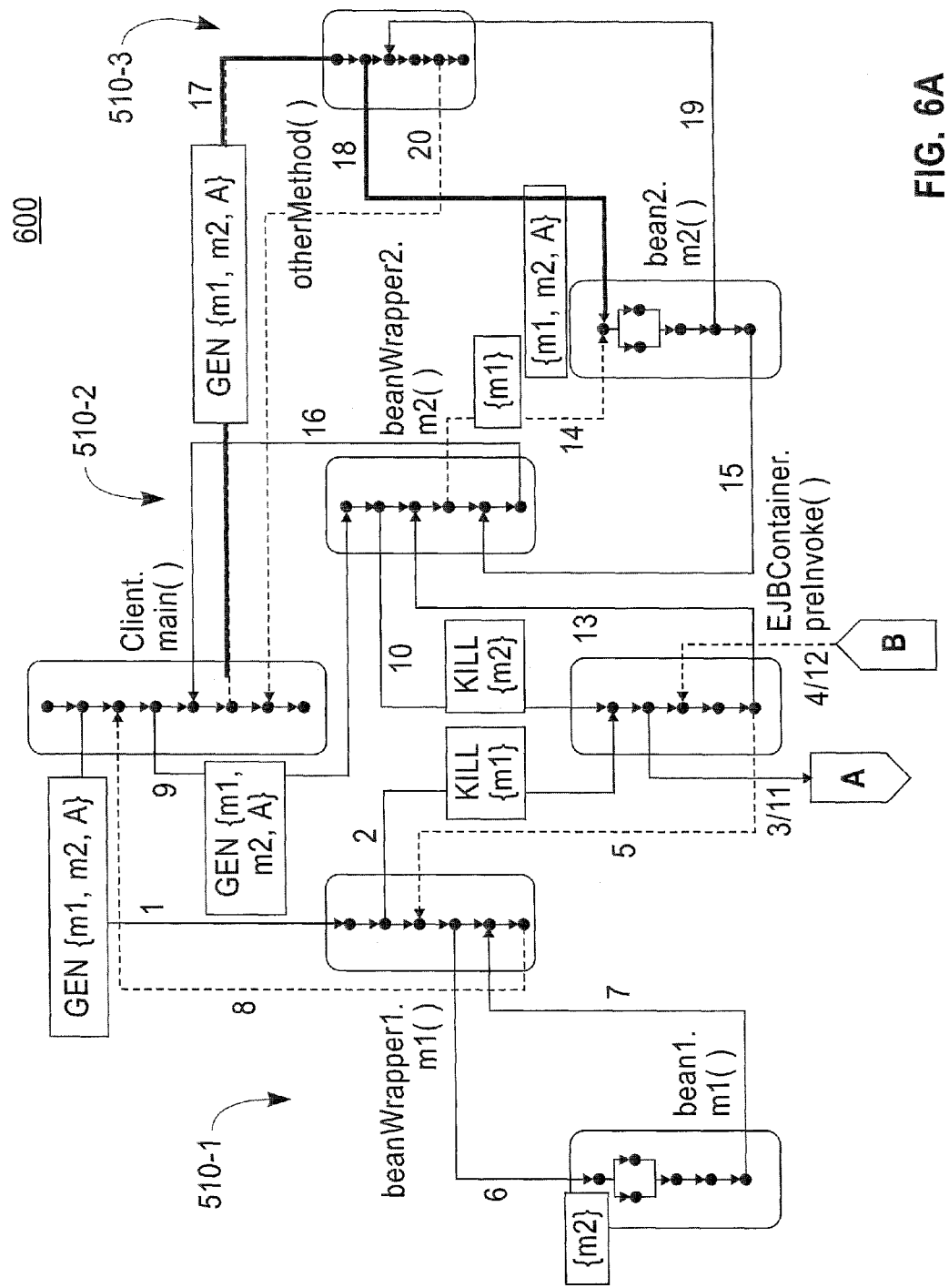
FIGS. 6A and 6B, is a more detailed version of FIG. 5, and includes an additional method not shown in FIG. 5.
Figure 6B:
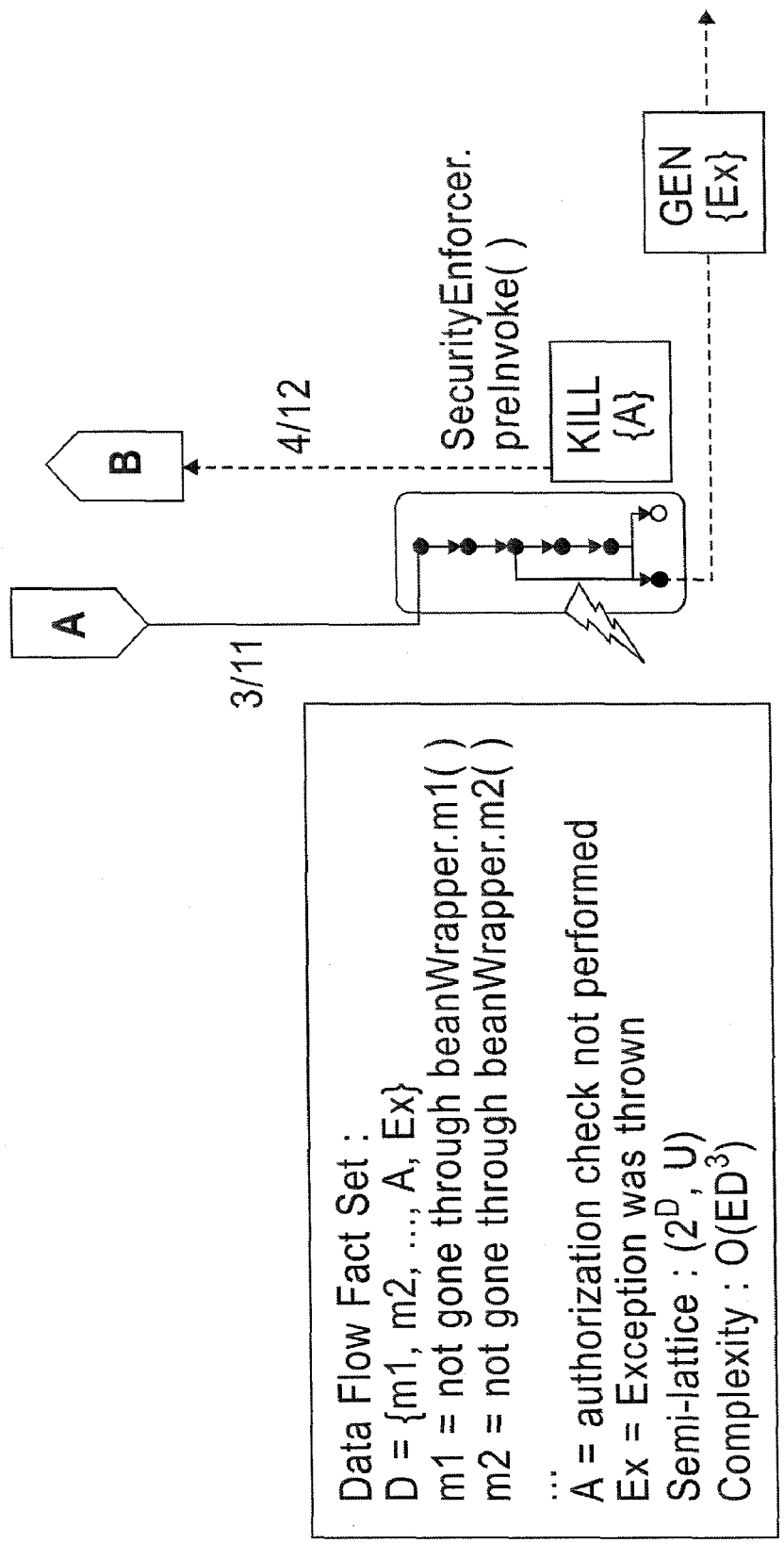
Figure 7:
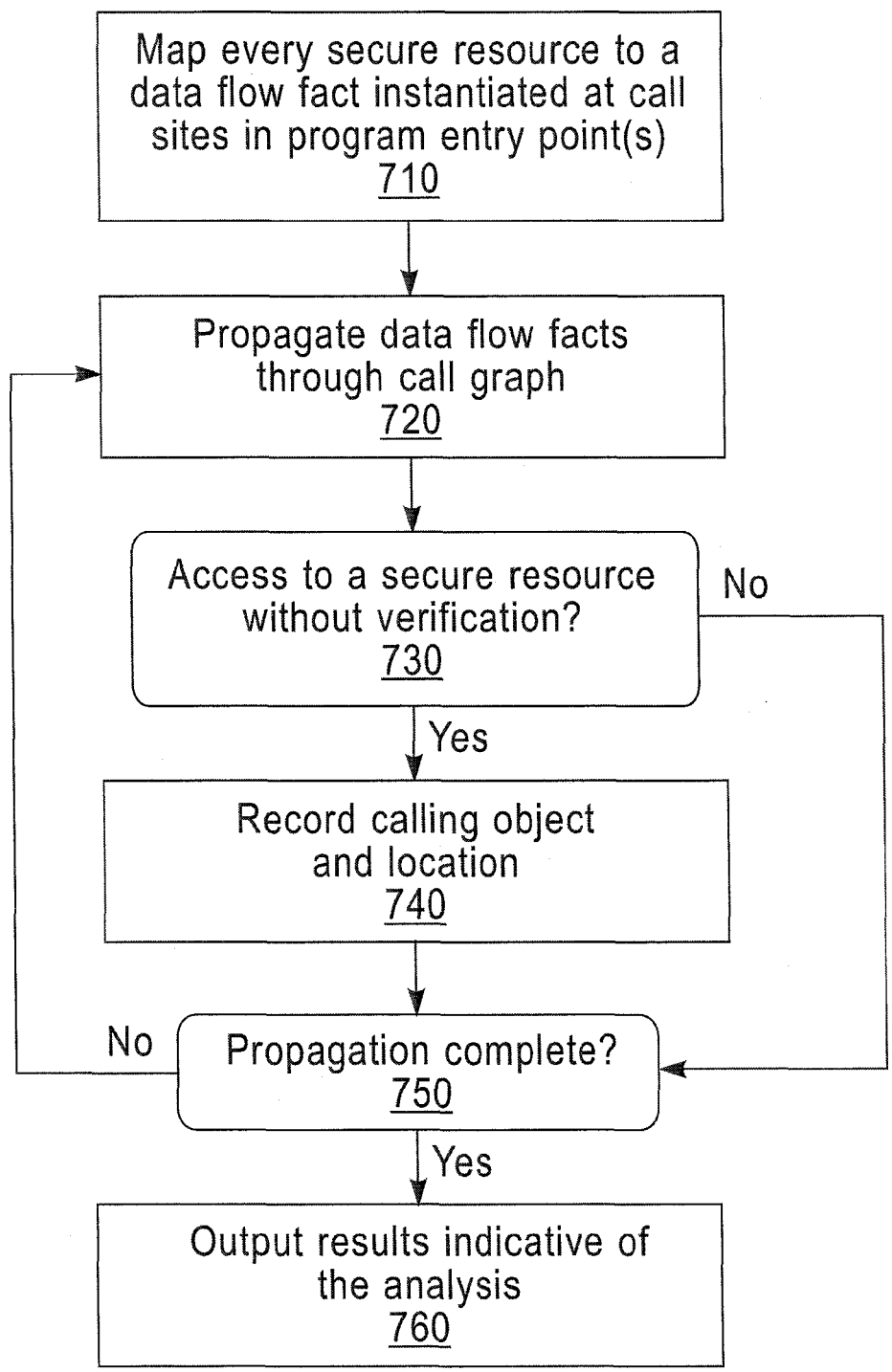
FIG. 7 is a flowchart of an exemplary method for an analysis of a software program for missing verification checks.

FIGS. 5-7 are used to illustrate static analysis of a software program 360 for missing verification checks. Turning now to these figures, FIG. 5 is an example of a call graph 500 for an exemplary software program 300. FIG. 6, including FIGS. 6A and 6B, is a more detailed version of FIG. 5, and includes an additional method not shown in FIG. 5. The more detailed version 600 in FIG. 6 of call graph 500 includes the method otherMethod( ) not shown in FIG. 5. FIG. 7 is a flowchart of an exemplary method 700 for an analysis of a software program for missing verification checks. Method 700 is performed in an exemplary embodiment by the verification and analysis tool 230. It is noted that in FIG. 6, the dashed and solid lines are used to distinguish the edges.

In the example of FIGS. 5 and 6, the objects (and their methods) bean1.m1( ) and bean2.m2( ) are the secure resources 210-3, and the verification and analysis tool 230 is to analyze the software program 360 corresponding to the call graph 500 to ensure that verification occurs for each access to the objects bean1.m1( ) and bean2.m2( ). The call graph 500 and detailed version 600 are created by static analysis tool 220.

Paths through the call graph 500 that adhere to verification (that is, verification is performed prior to access of the secure resources bean1.m1( ) and bean2.m2( )) include a first path 510-1 having edges (in this order) of 1, 2, 3, 4, 5, 6, 7, and 8. The verification checker 210-4 is the SecurityEnforcer.preInvoke( ) object, and this object is called and verification is performed (prior to edge 4) by the verification checker 210-4 prior to access (edge 6) of the secure resource 210-3 bean1.m1( ). The paths also include a second path 510-2 having edges (in this order) of 8, 9, 10, 11, 12, 13, 14, 15, and 16. The verification checker 210-4 of SecurityEnforcer.preInvoke( ) is called and verification is performed (prior to edge 12) by the verification checker 210-4 prior to access (edge 14) of the secure resource 210-3 bean1.m1( ).

As described below, FIG. 6 includes these two paths 510-1 and 510-2, but also include a third path 510-3 having edges 17, 18, 19, and 20, where access to the secure resource 210-3 is performed without going through a corresponding verification check (e.g., by verification checker 210-4 of the SecurityEnforcer.preInvoke( )).

In block 710 of method 700, every secure resource 210-4 is mapped to a data flow fact. In the example of FIG. 6, the data flow fact set includes D={m1, m2, . . . , A, Ex}. The fact m1 indicates that the software program has not passed through beanWrapper.m1( ); the fact m2 indicates that the software program not passed through beanWrapper.m2( ); the fact A indicates that an authorization check was not performed; and the fact Ex indicates that an exception was thrown. The secure resource 210-3, via input 210, provides the secure resources to be examined and in one example would contain indications that bean1.m1( ) and bean2.m2( ) objects are secure resource 210-3. This allows the facts m1 and m2 to be generated and these facts correspond to the beanWrapper.m1( ) and beanWrapper.m2( ) objects, since these objects are the defined gateways to their corresponding secure resources bean1.m1( ) and bean2.m2( ), according to a security-system specification. In other examples, certain objects, files, sockets, and methods (and potentially any other objects/methods that access, e.g., the objects, files, sockets, and methods) are predetermined to be secure resources. For example, no input 210 need be provided to define certain sockets as secure resources 210-3. Similarly, no input 210 need be provided in the example of FIG. 6 because the bean1.m1( ) and bean2.m2( ) are enterprise JAVA beans (EJB in "EJBContainer") and enterprise JAVA beans are (in an exemplary embodiment) by definition secure resource 210-3.

In other words, mapping may be performed by defining a method fact for each secure resource 210-3 and a verification fact (e.g., "A" in FIG. 6) for each verification checker 210-4 (in this example, SecurityEnforcer.preInvoke( )). The example of FIG. 6 uses authorization as one type of verification, and therefore the verification fact is an authorization fact "A". Additionally, any exceptions by the verification checker 210-4 are captured by defining in the mapping an exception fact (e.g., "Ex" in FIG. 6). Generation of an exception without a corresponding killing of an authorization fact indicates that a secure resource 210-3 was not properly authorized.

If D is the (finite) set of data-flow facts as defined above, we indicate with $2^D$ the power set of D, meaning the set of the subsets of D. $2^D$ is finite because D itself is finite. $2^D$ is naturally equipped with the union operator, $\cup$. In fact, the pair $(2^D, \cup)$ is known to be a semi-lattice. At every step in the propagation system, elements of $2^D$ are propagated throughout the IFDS graph, and at each step of the propagation, set unions are performed (except in the case in which a data-flow fact is killed). This means that the function that, for each IFDS graph node, transforms the set of data-flow facts associated with that node into a more precise set on each iteration of the propagation process is monotonic. Since the $(2^D, \cup)$ semilattice is finite, it is complete and has finite height. Therefore, the propagation process can be proved (using the well-known result of Tarski's theorem) to converge in finite time. In this case, the time complexity of this algorithm is $O(ED^3)$ as shown in the IFDS original paper, published at the ACM Symposium on Principles of Programming Languages (POPL) 1995 by Thomas Reps, Susan Howitz and Shmuel Sagiv.

Additionally in block 710, the data flow facts are instantiated at call sites in program entry points (e.g., for procedure calls within the software program entry points). For example, at the beanWrapper.m1( ) call site in program entry point Client.main( ), the data fact set of {m1, m2, A} is generated, e.g., by the verification and analysis tool 230: GEN {m1, m2, A}. This also occurs at the call sites for the beanWrapper.m2( ) and the otherMethod( ).

In block 720, the data flow facts are propagated through the call graph. For instance, in path 510-1, the data flow facts of {m1, m2, A} are propagated through this path. At edge 2, the data flow fact m1 is "killed", and this indicates beanWrapper.m1( ) was passed through. At edge 4, the authorization fact A is also killed, which means that verification has been performed. At entry (edge 6) into bean1.m1( ), the data flow fact m2 still exists, but m1 and A are both killed, which means that authorization for bean1.m1( ) has been performed prior to entry into this specific secure resource 210-3 of bean1.m1( ). That is, the data facts that correspond to the bean1.m1( ) object are killed, and this indicates that verification was performed prior to entry to bean1.m1( ). In this example, block 730 (access to a secure resource without verification?) would be NO and block 750 would be performed. Because propagation is not complete, method 700 continues at block 720.

With regard to path 510-2, at edge 10, the data flow fact m2 is killed, which means beanWrapper.m2( ) was passed through. At edge 12, the authorization fact A is also killed, which means that verification has been performed. At entry (edge 14) into bean2.m2( ), the data flow fact m2 still exists, but m1 and A are both killed, which means that authorization for bean2.m2( ) has been performed prior to entry into the specific secure resource 210-3 of bean2.m2( ). That is, the data facts that correspond to the bean2.m2( ) object are killed, and this indicates that verification was performed prior to entry to bean2.m2( ). In this example, block 730 (access to a secure resource without verification?) would be NO and block 750 would be performed. Because propagation is not complete, method 700 continues at block 720.

Regarding path 510-3, at edge 18, bean2.m2( ) is entered with the data flow fact set of {m1, m2, and A}, as no method facts or the authorization fact were killed. The answer to the query in block 730 (access to a secure resource without verification?) would be YES and block 740 would be performed. The calling object (otherMethod( )) and location (e.g., line number) where the calling object called the bean2.m2( ) object are recorded in block 740. Block 750 is performed again. Because propagation is not complete, method 700 continues at block 720.

This process continues until the entire program has been examined. Then, block 750 would be YES, and in block 760, the verification and analysis tool 230 outputs results indicative of the analysis. As an example, the output could indicate that there was no verification for the method call from otherMethod( ) to beanWrapper.m2( ).

FIGS. 5-7 have been used to illustrate exemplary static analysis solutions to detect whether verification checks are missing. FIGS. 8A, 8B, and 9 are used to illustrate exemplary static analysis for whether verification checks are present but may be invalid due to the possibility of a resource (or a reference or other information defining access to the resource) changing between verification-enforcement and access.

Figures 8A, 8B:
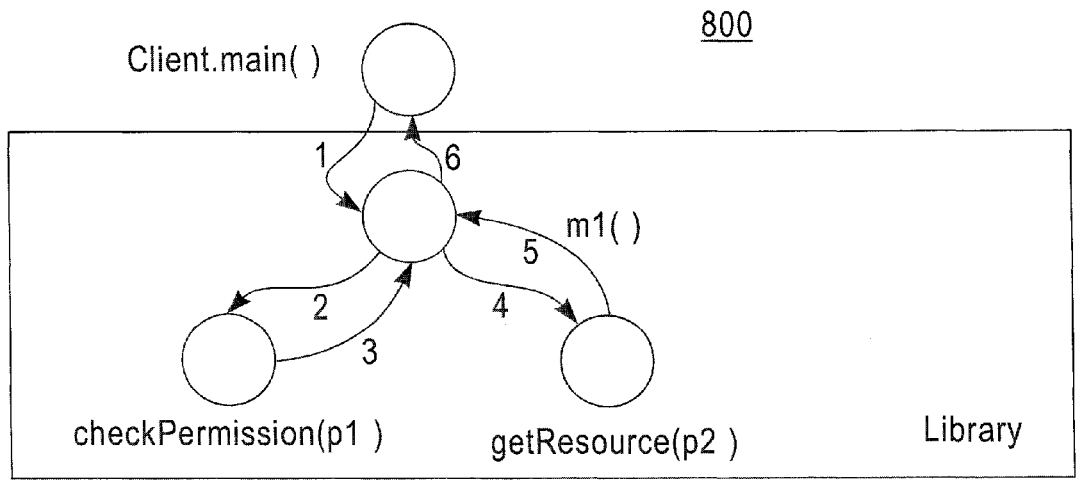
FIG. 8A is an exemplary call graph used to illustrate analysis for verification checks that are present but invalid at time of access to a secure resource.
FIG. 8B shows exemplary values for pointers p1 and p2 from FIG. 8A.
Figure 9:
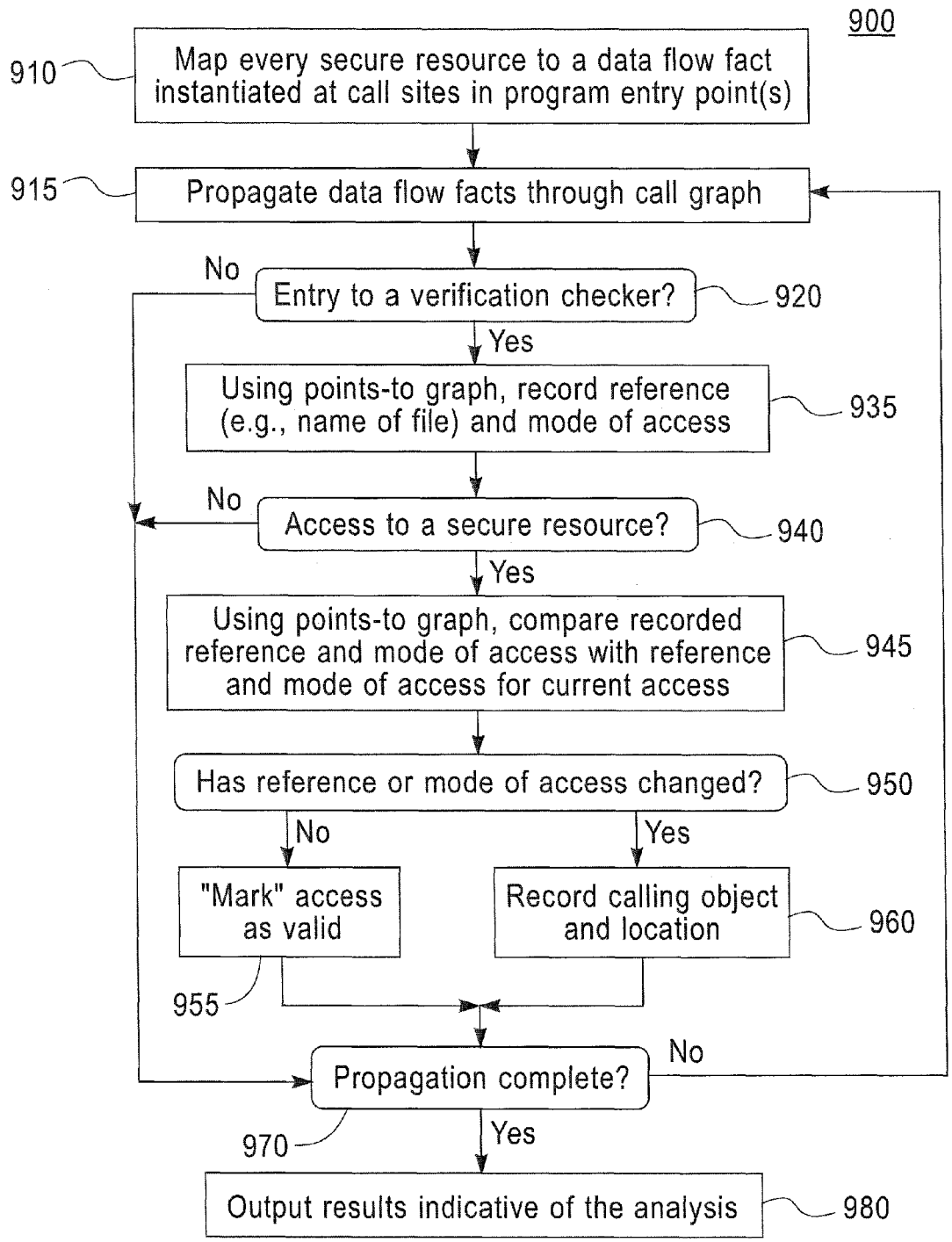
FIG. 9 is a flowchart of an exemplary method for determining and reporting on verification checks that are present but invalid at time of access to a secure resource.

Turning to FIGS. 8A, 8B, and 9, FIG. 8A is an exemplary call graph 800 used to illustrate analysis for verification checks that are present but invalid at time of access to a secure resource. FIG. 8B shows exemplary values for pointers p1 and p2 from FIG. 8A. FIG. 9 is a flowchart of an exemplary method 900 (performed, e.g., by verification and analysis tool 230) for determining and reporting on verification checks that are present but invalid at time of access to a secure resource.

It is important to verify that the verification check was performed specifically for the secure resource 210-3 being accessed. The relationship between the secure resource 210-3 and the verification check is system specific, but in general the verification requires comparing objects. In some systems, the system expects the object being checked to be the same as the one being accessed. This may or may not be true. In other cases (e.g., JAVA 2 platform, standard edition), the object being accessed (e.g., the name of a file) is assigned to a field of the object being checked (e.g., a FilePermission). If the name of the file is modified between the time of verification and the time of access, then a file could be accessed without verification.

FIGS. 8A and 8B illustrate these concepts. In FIG. 8A, the access to getResource( ) is verified, as there is a call to checkPermission( ) first, which performs verification. The object checkPermission( ) uses the pointer p1, which is a pointer to a secure resource 210-3. However, the object getResource( ) uses the pointer p2, which may or may not be equivalent to p1. If the pointers p1 and p2 are the same, then the secure resource 210-3 that was verified by checkPermission( ) is the same as that accessed by getResource( ). If as illustrated by FIG. 8B, however, the two pointers p1 and p2 are not the same, then the analysis should verify which resources each pointer can point to, and a potential error should be generated, as a different secure resource 210-3 might be accessed than the secure resource 210-3 that was verified.

FIG. 8B shows that pointer p1 can reference a single secure resource 210-3 r1, or multiple secure resources 210-3 r1 and r2 (as examples). If pointer p2 is equivalent to p1 for the one or more references to the secure resources 210-3, then no error should occur. No potential error is indicated in FIG. 8B by "OK". On the other hand, if the pointer p2 is not equivalent to p1 for the one or more references to the secure resources 210-3, then an indication of a potential error should be made. A potential error is indicated by "NO". The first case in FIG. 8B does not lead to any potential error because the analysis has established that both p1 and p2 point to the same resource r1. This means that when r1 is accessed, access to it has already been authorized. Since the analysis is conservative, there is no chance that p1 or p2 could point to something other than r1, or the analysis would have reported that. The second case in FIG. 8B is an error because the resource being accessed (r2) is different from the resource to which access was authorized (r1). The third case in FIG. 8B represents a potential error because the resource that is accessed might be r2, whereas the resource to which access was authorized is r1. The fourth case in FIG. 8B is also a potential error because the system might have authorized access to r2, while the resource being accessed is r1. For the fifth case, the analysis computes the same set of resources that can be pointed to by p1 and p2. Unlike case 1, such set contains more than just one element. In the specific case of FIG. 8B, two elements are in the set: r1 and r2. There could potentially be a problem if the system authorizes access to r1 but then r2 is accessed, or vice versa access to r2 is authorized and then r1 is accessed. This ambiguity can be resolved with the use of static analysis, by verifying that the resources are correctly matched.

Method 900 starts in block 910, where every secure resource is mapped to a data flow fact instantiated at call sites in program entry points. The mapping and instantiation have been described above in reference to block 710. In block 915, data flow facts are propagated through the call graph. This propagation is also described above in reference to FIG. 7.

In block 920, it is determined if there is entry to a verification checker 210-4 that corresponds to a secure resource 210-3. For example, in FIG. 6, at edge 3 and entry into SecurityEnforcer.preInvoke( ), there is an entry to the verification checker 210-4 that corresponds to the secure resource 210-3 of bean1.m1( ). As another FIG. 6 example, at edge 11 and entry into SecurityEnforcer.preInvoke( ), there is an entry to the verification checker 210-4 that corresponds to the secure resource 210-3 of bean2.m2( ). If there is no entry to a verification checker 210-4 (block 920=NO), the method 900 proceeds to block 970.

If there is an entry to a verification checker 210-4, using the points-to graph 240, the verification and analysis tool 230 records a reference to the secure resource 210-3 (e.g., a name of a file) and mode of access (e.g., "read", "write", "execute", or "delete") in block 935. It is noted that in this block any information that uniquely references a secure resource 210-3 may be used. For instance, a port number might be used for a network socket, and such a port number could also be recorded.

In block 940, it is determined if there is an access to a secure resource 210-3. If not (block 940=NO), the method 900 proceeds in block 970. If so (block 940=YES), in block 945, the verification and analysis tool 230 uses the points-to graph 240 and compares the recorded reference and mode of access for the secure resource 210-3 with the current reference and mode of access for the secure resource 210-3. As described above, it is noted that in this block any information that uniquely references a secure resource 210-3 may be used. For instance, a port number might be used for a network socket, and such a port number could also be compared. If the reference and the mode of access have not changed (block 950=NO), the access is "marked" as valid in block 955. It should be noted that no "mark" need be made; instead, no action need be taken. If the reference or the mode of access has changed (block 950=YES), the calling object and location is recorded in block 960. This allows a later output indicating that there is a potential error in the calling object at the location therein.

In block 970, it is determined if the propagation is complete. If not (block 970=NO), the method 900 continues in block 915. If so (block 970=YES), the method 900 continues in block 980, when the verification and analysis tool 230 outputs results indicative of the analysis.

Figure 10A:
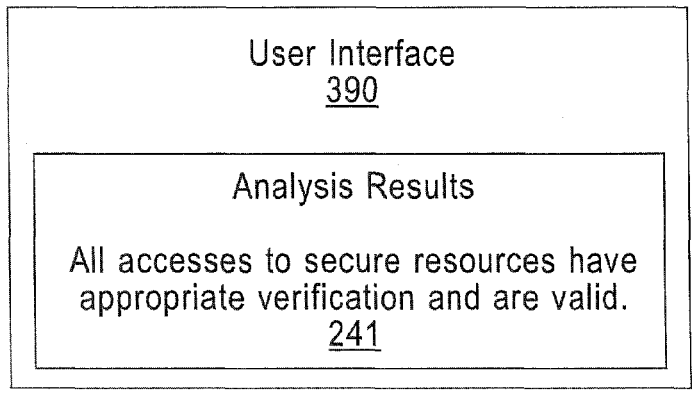
FIGS. 10A and 10B are examples of a user interface displaying security reports.
Figure 10B:
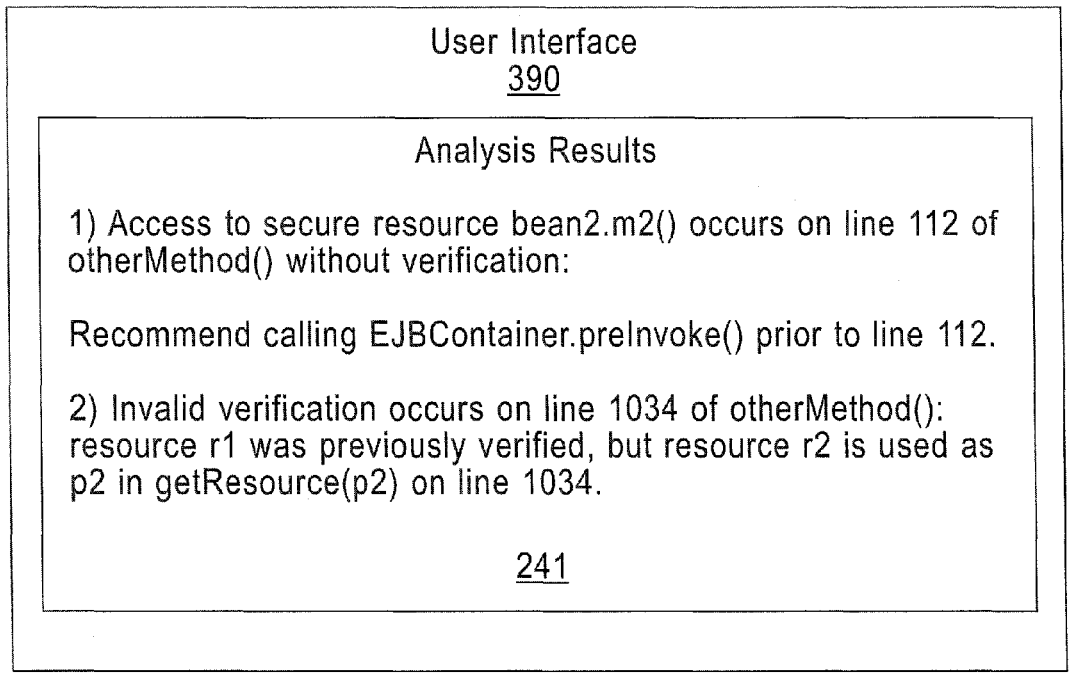

One technique for outputting results indicative of the analysis (see, e.g., blocks 440 of FIG. 4, 760 of FIGS. 7, and 970 of FIG. 9), is via a security report 241. FIGS. 10A and 10B are examples of user interfaces 390 displaying security reports 241 (e.g., to a user). FIG. 10A is an error free example, where there were no accesses to secure resources without verification and also all accesses to secure resources were valid.

In FIG. 10B, which refers to the example in FIG. 6, there is an indication of an error of an access to a secure resource 210-3 without verification: "Access to secure resource bean2.m2( ) occurs on line 112 of otherMethod( ) without verification". Note also that a recommendation is made: "Recommend calling EJBContainer.preInvoke( ) prior to line 112". This recommendation can be made because the verification and analysis tool 230 knows the proper verification checker 210-4 for the secure resource 210-3. Additionally, FIG. 10B has an example where a verification check is present but may be invalid due to a resource changing between verification-enforcement and access: "Invalid verification occurs on line 1034 of otherMethod( ): resource r1 was previously verified, but resource r2 is used as p2 in getResource(p2) on line 1034."

Figure 11:
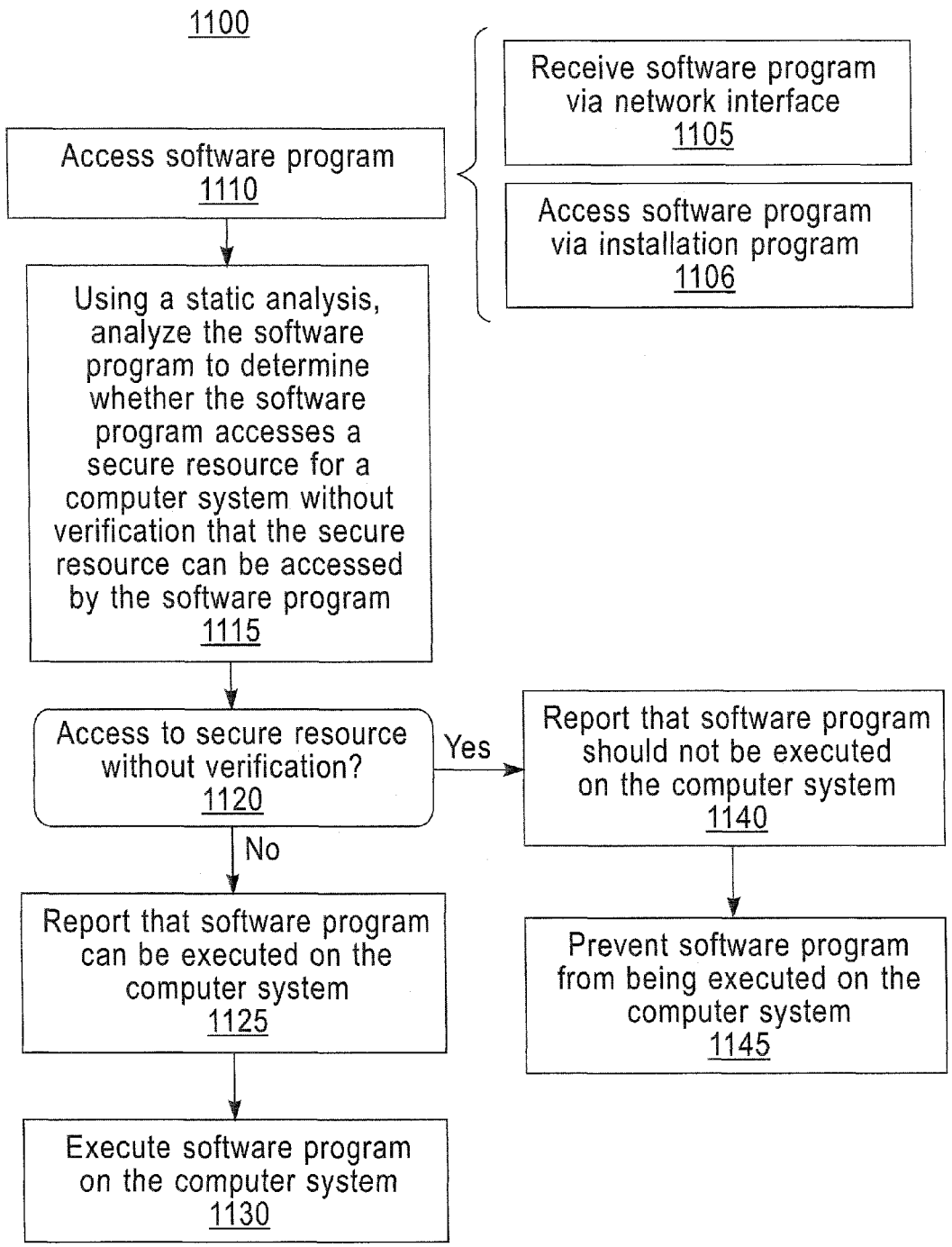
FIG. 11 is a flowchart of an exemplary method for performing verification using static analysis of software program access to secure resources for a computer system, where the verification is performed prior to executing the software program on a computer system.

Turning now to FIG. 11, a flowchart is shown of an exemplary method 1100 for performing verification using static analysis of software program access to secure resources for a computer system, where the verification is performed prior to executing the software program on a computer system. Method 1100 is typically performed by verification and analysis tool 230. In block 1110, the verification and analysis tool 230 accesses a software program, such as by receiving the software program via network interface 230 (block 1105) or via an installation program (e.g., or process) (block 1106). Such installation program could be resident in memory 310, such as via a CDROM or DVD or memory stick. In block 1115, using a static analysis, the verification and analysis tool 230 analyzes the software program to determine whether the software program accesses a secure resource for a computer system without verification that the secure resource can be accessed by the software program. This is explained above, e.g., in reference to FIGS. 5, 6, 7, 8A, 8B, and 9.

In block 1120, it is determined if there is an access to a secure resource 210-3 without verification. Techniques for this determination have been described above. It is noted that in this instance, the secure resources 210-3 and verification checker 210-4 would likely be predetermined and not included as input 210. However, these could also be included, for instance, as part of an installation package.

If there is no access to secure resources without verification (block 1120=NO), the verification and analysis tool 230 can optionally report (e.g., to an operating system or to a user) that the software program can be executed on the computer system (block 1125). Block 1125 therefore may report to a user, via user interface 390, that the software program has been analyzed and appears safe for execution. The software program is then allowed (e.g., by the operating system or by the verification and analysis tool 230) to execute on the computer system (block 1130).

If there is an access to a secure resource 210-3 without verification (block 1120=YES), in block 1140, the verification and analysis tool 230 reports (e.g., via user interface 390 and/or to an operating system) that the software program should not be executed on the computer system (e.g., because the software program failed an analysis attempting to verify that the software program did not access secure resources 210-3 without verification). In block 1145, the software program is prevented from executing on the computer system. The operating system and/or the verification and analysis tool 230 can prevent the software program from executing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
using a static analysis, analyzing a software program to determine whether the software program accesses a secure resource for a computer system without verification that the secure resource can be accessed by the software program,
wherein analyzing the software program comprises:
determining whether a verification check is missing for an access by the software program to the secure resource;
mapping every secure resource to a data flow fact instantiated at one or more call sites for procedure calls within the software program, the data flow facts for each secure resource including a method fact corresponding to a method accessing the secure resource and a verification fact corresponding to a verification checker that corresponds to the secure resource;
propagating the data flow facts through a call graph of the software program;
killing a method fact corresponding to a secure resource in response to entry into a predetermined method corresponding to a secure resource;
killing a verification fact corresponding to a verification checker that corresponds to a secure resource;
for any access to a secure resource where both a method fact corresponding to a predetermined method corresponding to the secure resource and a verification fact corresponding to a verification checker that corresponds to the secure resource are not killed at the access, determining that a verification check is missing for the access by the software program to the secure resource; and
in response to an access by the software program to the secure resource without verification that the secure resource can be accessed by the software program, outputting a result indicative of the analyzing.

2. The method of claim 1, wherein the software program includes one or more of the following: source code, byte code, library modules, application code, or object code.

3. The method of claim 1, where the verification is authentication.

4. The method of claim 1, where the verification is authorization.

5. The method of claim 1, wherein the analyzing is performed for any and all accesses to secure resources made in the software program.

6. The method of claim 1, wherein the analyzing is performed prior to the execution of the software program on the computer system.

7. The method of claim 6, further comprising preventing the software program from executing on the computer system in response to an access by the software program to the secure resource without verification that the secure resource can be accessed by the software program.

8. The method of claim 1, wherein the computer system is one of the following: a client system, a server, or a mobile device.

9. A method, comprising:
using a static analysis, analyzing a software program to determine whether the software program accesses a secure resource for a computer system without verification that the secure resource can be accessed by the software program, wherein analyzing the software program further comprises:
determining whether a verification check is present for an access by the software program to the secure resource but where the verification check is invalid due to at least one of a reference to the secure resource or a method of access to the secure resource changing between verification by the verification check and access to the secure resource by the software program;

for execution of a verification checker corresponding to a selected secure resource, using a points-to graph corresponding to the software program, recording a reference to the selected secure resource and recording a mode of access to the selected secure resource; and for a subsequent access to the selected secure resource, determining whether one or both of the reference to the selected secure resource or the mode of access to the selected secure resource has been modified from the recorded reference to the selected secure resource and the recorded mode of access to the selected secure resource; and in response to a modification of the one or both of the reference to the selected secure resource or the mode of access to the selected secure resource, determining that the verification check corresponding to the selected secure resource is invalid; and in response to an access by the software program to the secure resource without verification that the secure resource can be accessed by the software program, outputting a result indicative of the analyzing.

10. The method of claim 9, wherein the software program includes one or more of the following: source code, byte code, library modules, application code, or object code.

11. The method of claim 9, where the verification is authentication.

12. The method of claim 9, where the verification is authorization.

13. The method of claim 9, wherein the analyzing is performed for any and all accesses to secure resources made in the software program.

14. The method of claim 9, wherein the analyzing is performed prior to the execution of the software program on the computer system.

15. The method of claim 14, further comprising preventing the software program from executing on the computer system in response to an access by the software program to the secure resource without verification that the secure resource can be accessed by the software program.

16. The method of claim 9, wherein the computer system is one of the following: a client system, a server, or a mobile device.

* * * * *